United States Patent [19]

James et al.

[11] Patent Number: 5,463,200
[45] Date of Patent: Oct. 31, 1995

[54] MARKING OF A WORKPIECE BY LIGHT ENERGY

[75] Inventors: Douglas J. James, Ottawa; Kenneth J. Andrews, Stettsville; Terrence J. McKee, Nepean, all of Canada

[73] Assignee: Lumonics Inc., Kanata, Canada

[21] Appl. No.: 16,262

[22] Filed: Feb. 11, 1993

[51] Int. Cl.⁶ ................................................ B23K 26/06
[52] U.S. Cl. ........................... 219/121.68; 219/121.69; 219/121.77; 219/121.75
[58] Field of Search ..................... 219/121.68, 121.69, 219/121.77, 121.73, 121.75

[56] References Cited

U.S. PATENT DOCUMENTS

| | | | |
|---|---|---|---|
| 3,586,816 | 6/1971 | Hagen . | |
| 4,383,255 | 5/1983 | Grandjean et al. | 340/764 |
| 4,563,059 | 1/1986 | Clark et al. | 350/330 |
| 4,584,056 | 4/1986 | Perret et al. | 156/630 |
| 4,707,711 | 11/1987 | Hunter | 346/108 |
| 4,734,558 | 3/1988 | Nakano et al. | 219/121.73 |
| 4,818,835 | 4/1989 | Kuwabara et al. | 219/121.6 |
| 5,055,653 | 10/1991 | Funami et al. | 219/121.75 |
| 5,302,798 | 4/1994 | Inagawa et al. | 219/121.7 |

FOREIGN PATENT DOCUMENTS

| | | |
|---|---|---|
| 0488033 | 6/1992 | European Pat. Off. . |
| 2130698 | 11/1972 | France . |

OTHER PUBLICATIONS

Scaroni, J., "Yag Laser: Making its Mark on Metals", Design News, Jul. 1985.
Scaroni, J., "Wafer Identification Marking Via Laser", Microelectronic Manufacturing and Testing, Nov. 1985.
Higgins, J. W., "Laser marking of passive components, hybrids and semiconductors", SPIE, vol. 611, (1986).
"Fast laser pulses can etch a pattern in a moving part on a production line", Laser Focus, Jul. 1975.
Dammann, H., "Synthetic digital-phase gratings-Design, features, application applications", Proceedings of SPIE (International Society of Optical Engineering (US)), vol. 437, pp. 72-78 (1983).
Hudson, T. D. et al., "Optically-addressed Spatial Light Modulators", Optics and Laser Technology, vol. 23, No. 5, pp. 297-302 (1991).
O'Callaghan, M. J. et al., "Diffractive ferroelectric liquid-crystal shutters for unpolarized light", Optics Letters, vol. 16, No. 10, pp. 770-772, May 1991.
Gregory, D. A., "Optical characteristics of a deformable-mirror spatial light modulator", Optics Letters, vol. 13, No. 1, pp. 10-12, Jan. 1988.
Hirabayashi, K. et al., "Spatial light modulators with super twisted nematic liquid crystals", Optics Letters, vol. 16, No. 10, pp. 764-766, May 1991.
Marrakchi, A. et al., "Generation of programmable coherent source arrays using spatial light modulators", Optics Letters, vol. 16, No. 12, pp. 931-933, Jun. 1991.
Boysel, R. M., "A 128×128 frame-addressed deformable mirror spatial light modulator", Optical Engineering, vol. 30, No. 9, pp. 1422-1427, Sep. 1991.
McKnight, D. J. et al., "Development of a spatial light modulator: a randomly addressed liquid-crystal-over-nMOS array", Applied Optics, vol. 28, No. 22, pp. 4757-4762, Nov. 1989.
Collings, N. et al., "Evolutionary development of advanced liquid crystal spatial light modulators", Applied Optics, vol. 28, No. 22, pp. 4740-4746, Nov. 1989.
Noble, N., "Acoustic-Optic Devices: Diverse Applications", Lasers and Optronics, pp. 27-29, Mar. 1992.
Pape, D. R., "Multichannel Bragg cells: design, performance, and applications" Optical Engineering, vol. 31, No. 10, pp. 2148-2158, Oct. 1992.
Patent Abstracts of Japan, vol. 7, No. 41, Feb. 83 JPA 57 190 794.

*Primary Examiner*—Mark H. Paschall

[57] ABSTRACT

The known technique of marking (including machining) a workpiece by light energy, e.g. a pulsed laser beam, in order to create a pattern of marks on the workpiece is improved by converting a primary beam into a plurality of individual beamlets that are arranged in an array corresponding to the desired pattern and are each focused independently of the other beamlets. This independent focusing enables the size and energy density (and hence the marking effect) of each beamlet when it strikes the workpiece to be dependent on the relative location of the workpiece and the respective beamlet, while being independent of the size of the overall pattern. This feature enables variation of the ratio between the pitch between individual marks (which determines the size of the overall pattern) and the size of each mark, and hence selection of the optimum value of this ratio for a given situation. As a result, a pattern of a chosen size can be made using a primary beam of lower power than has previously been possible, or alternatively, the same beam power can be used to make a larger mark. In another aspect the invention provides for utilization of the previously wasted energy of those beamlets not used to form the patterned array, by redirecting these beamlets either to reinforce one or more of those beamlets that do form the array or to form a second pattern of marks on the workpiece.

16 Claims, 5 Drawing Sheets

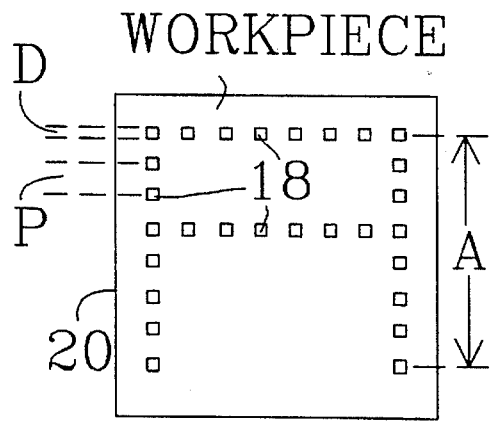
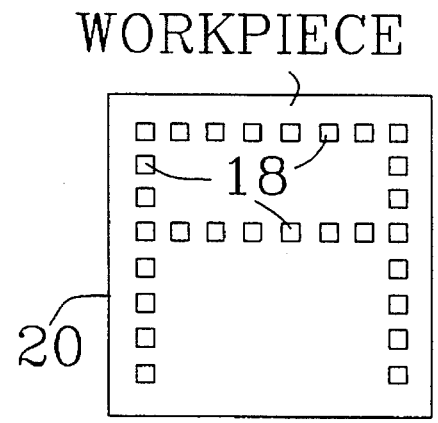
FIG.6         FIG.6A
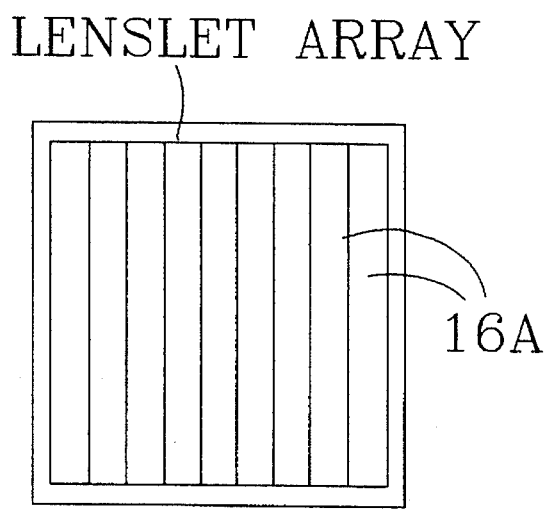
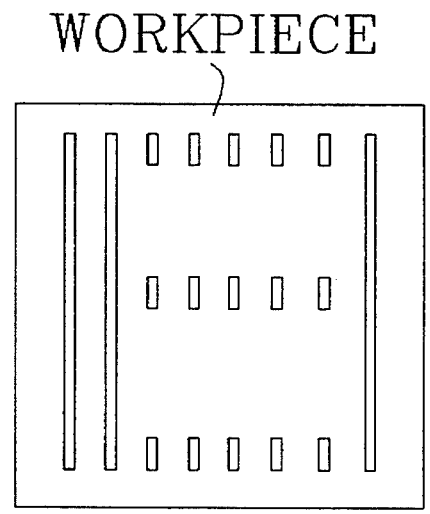
FIG.18        FIG.19

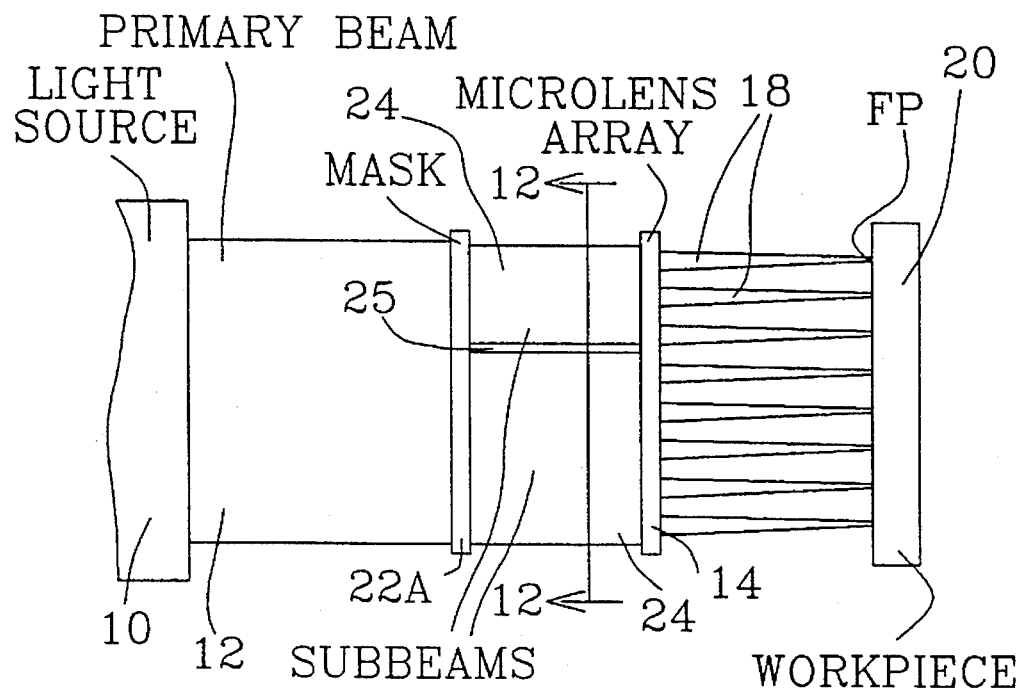
FIG.11
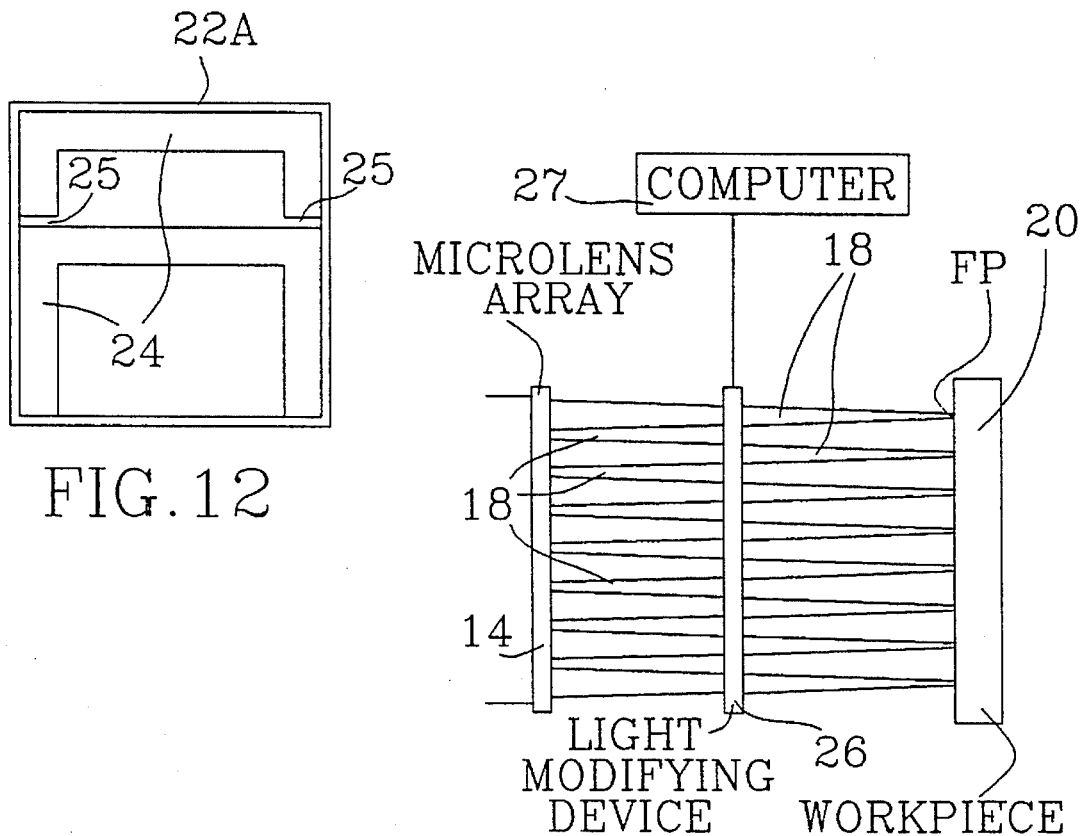
FIG.12
FIG.13

MARKING OF A WORKPIECE BY LIGHT ENERGY

FIELD OF THE INVENTION

The invention relates to the marking (including machining) of a workpiece by light energy in order to create a selected pattern thereon.

Simple marking may take the form of creating a color or chemical change, a series of relatively shallow depressions or grooves in the workpiece surface, or any other surface modification that exhibits a pattern in a manner that is recognisable either to the human eye or to an electronic or mechanical sensing device. The term "machining" is usually applied to more extensive modification of the workpiece and often refers to such procedures as forming deep grooves, cuts or through holes in the workpiece, or in at least a surface layer thereof. Since machining is also recognisable in the manner indicated above, it is considered for the present purposes to constitute a more pronounced form of marking. Therefore, both simple marking and the more drastic modification usually referred to as machining, to both of which techniques the present invention applies, will from henceforth be referred to in this specification and the appended claims simply as "marking".

In addition to the marking of a workpiece to render it suitable for subsequent handling, e.g. the machining of a pattern of holes to receive fastening means (e.g. to receive screws, rivets or bolts), the marking contemplated in the present invention includes, but is not limited to, the formation of a recognisable alphanumeric character, a bar code, a logo, or any other symbol or combination of symbols that is required to appear on the workpiece.

The preferred form of light for achieving such marking is coherent light from a laser, but the invention does not exclude the use of incoherent light when it can be collimated into a beam containing sufficient energy to achieve the particular form of marking required. Particularly when the marking takes the form of a photosensitive change to the workpiece surface, a beam of incoherent light may well contain sufficient energy.

When a laser is used, it is usually convenient to employ a pulsed laser, but the use of a CW laser is not excluded. Although a Nd YAG laser has been chosen as the light source in an example given below, the invention includes the use of lasers at other wavelengths, such as carbon dioxide lasers at about 10 microns, excimer lasers in the spectral region of 0.2–0.4 microns, and semiconductor lasers in the spectral region of 0.6–1.2 microns.

BACKGROUND OF THE INVENTION

The use of lasers to mark patterns on a variety of materials and products (hereinafter simply referred to as workpieces) is well known. When the mark is to take the form of upsetting or ablating the material of the workpiece, the energy density of radiation emitted from a laser is often too low to mark directly. For this reason the laser beam has often been focused or imaged using a lens system to reduce the size of the interaction location on the workpiece and hence increase the energy density of the radiation at such location.

Two common laser marking methods are known as focused spot marking and mask imaging marking.

In focused spot marking a low pulse energy, high repetition rate, pulsed laser is used to mark a series of dots sequentially on the workpiece so that the selected pattern is eventually built up from these dots. In order to achieve enough energy density to form a mark, the laser beam is usually focused by a lens to a spot on the workpiece surface. The size of the spot can be adjusted by changing the focal length of the lens or by moving the workpiece away from the exact focal point of the lens in which case the size of the spot increases. For some materials, a continuous (non-pulsed) laser is also used for focused spot marking, in which case the mark is made up of continuous lines.

The mask imaging marking method uses a laser with a higher pulse energy and a beam profile that can mark all the information of the pattern on the workpiece with a single pulse. A stencil mask is used to transmit only the light containing the desired pattern information. The pattern is usually in a substantially solid format, rather than being made up of a large number of individual dots. In many cases, the energy density of the light forming the patterned array is not high enough to mark the product directly, so it is imaged using a lens system to reduce its size by a demagnification factor. Since the interaction area is then reduced by an amount equal to the square of the demagnification factor, the energy density at the workpiece surface is increased by the same amount. However, the size of the overall pattern formed on the workpiece is decreased by this procedure, which is often a disadvantage. Thus, a laser with a given pulse energy can be used to mark on a given material a pattern of a size that is determined by the laser pulse energy and the energy density required to mark that particular material. To achieve a larger pattern on the same material, the laser pulse energy must be increased, and this is usually difficult or expensive in practice.

On the other hand, this mask imaging technique has a number of advantages over the focused spot matrix marking technique. First, since the whole pattern is formed simultaneously, e.g. with a single pulse, the rate of marking of workpieces is often much faster and the pattern can be applied to a rapidly moving series of workpieces. Also, the characters or other symbols forming the selected patterns can be made relatively bold and hence more readily recognisable by the human eye, since they are formed from almost solid elements rather than dots. However, as indicated above, a major disadvantage of the mask imaging technique is that it requires a high pulse energy laser which is bulky and often expensive compared to a low pulse energy, higher repetition rate laser of the same average power, that is used to carry out the focused spot technique.

PRIOR ART

Examples of the focused spot technique are provided by "YAG Laser: Making its Mark on Metals" by J. Scaroni, published in Design News July 1985; and by "Wafer Identification Marking via Laser" by J. Scaroni, published in Microelectronic Manufacturing and Testing, November 1985. Examples of the mask imaging technique are provided by U.S. Pat. No. 4,818,835 issued Apr. 4, 1989 to K. Kuwabara et al., U.S. Pat. No. 4,734,558 issued Mar. 29, 1988 to M. Nakano et al., and U.S. Pat. No. 4,707,711 issued Nov. 17, 1987 to J. H. Hunter; as well as by "Laser Marking of Passive Components, Hybrids and Semiconductors" by J. W. Higgins, published in SPIE, Vol. 61 (1986); and "Fast laser pulses can etch a pattern in a moving part on a production line" published in Laser Focus, July 1975. An example of machining is provided by U.S. Pat. No. 5,055,653 issued Oct. 8, 1991 to Funami et al.

SUMMARY OF THE INVENTION

An object of the present invention is to provide a technique that employs the energy of the laser (or other light source) more efficiently, in that it enables either an increase in the size of the pattern that can be formed using a source of a given energy, or alternatively, the production with less energy of a pattern of equivalent size to that which had previously required a higher energy.

To achieve this object, the present invention employs a technique that may be considered as combining the focused spot and mask imaging techniques, in that, while the pattern is made up of selected ones of an array of dots, all these dots are formed on the workpiece simultaneously.

More specifically, the invention in one aspect consists of a method of marking a workpiece in a selected pattern with light energy from a primary light beam, comprising the steps of: (a) transmitting to the workpiece portions of the light of the primary beam required to produce marks on the workpiece, while at least partially absorbing or redirecting the remainder of the light of the primary beam, and (b) converting at least such mark-producing portions of the primary beam into a plurality of individual beamlets each focused independently of the other beamlets; said transmitting and converting steps being performed sequentially in either sequence, the beamlets corresponding to said mark-producing light portions forming respective marks on the workpiece that are disposed in an array corresponding to the selected pattern.

This procedure causes the size and energy density of each beamlet at the workpiece to be dependent on the relative location of the workpiece and the focal point of such beamlet, while being independent of the size of the overall pattern of marks on the workpiece. The result is a reduction of the energy requirement of the light source without a consequent reduction in the size of the marked pattern.

In another aspect, the invention provides for the avoidance of wasted energy due to the absorption or deflection of light not required to form the selected pattern by so directing at least one beamlet not forming the patterned array that it strikes the workpiece at another selected location, e.g. a location substantially coincident with a beamlet that does form part of the patterned array, whereby to reinforce the marking effect of the latter beamlet, or alternatively at a location to form a mark of a second pattern on the workpiece.

The invention also includes apparatus for carrying out such methods.

BRIEF DESCRIPTION OF THE DRAWINGS

FIG. 6 is a front view of the marking pattern to be formed on a workpiece, as seen at the plane 6—6 in FIG. 1;

FIG. 6A is a view similar to FIG. 6, but taken on the plane 6A—6A in FIG. 1;

FIG. 11 shows a modification of the embodiment of FIG. 1;

FIG. 12 is a cross-section taken on the plane 12—12 in FIG. 11;

FIG. 13 shows a side view of another modification of FIG. 1;

FIG. 18 shows an alternative form of microlens array; and

FIG. 19 shows a typical marking pattern on a workpiece using the microlens array of FIG. 18.

DETAILED DESCRIPTION OF THE EMBODIMENTS

Figure 1:
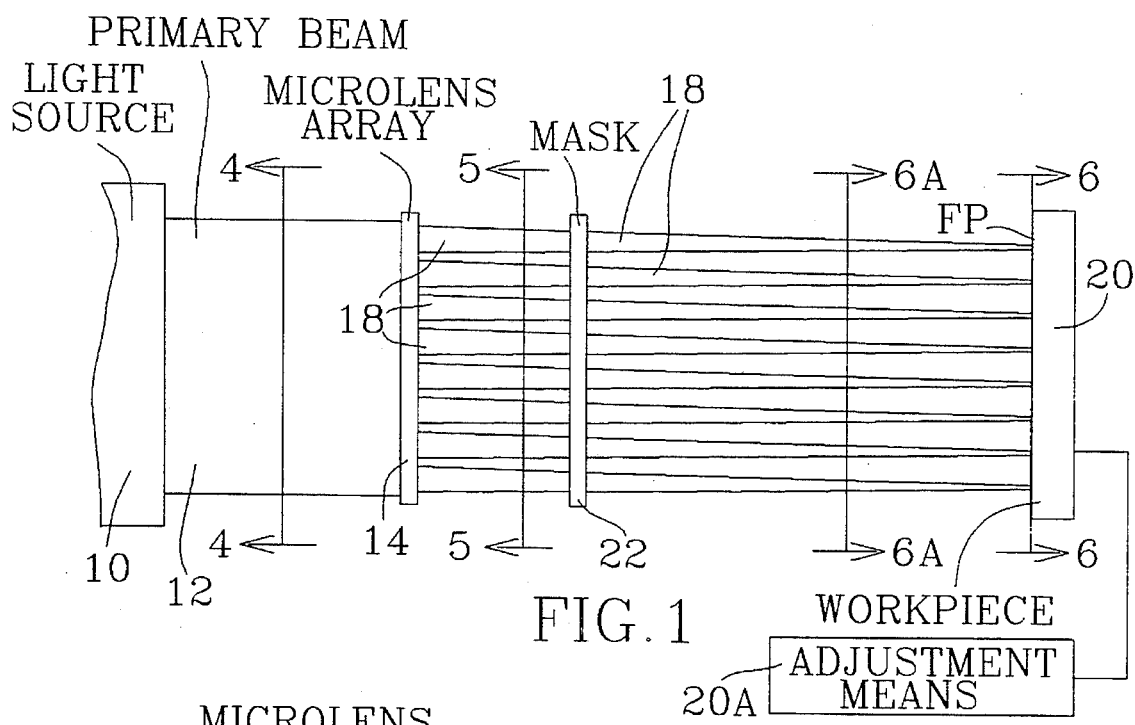
FIG. 1 is a diagrammatic side view of a marking system according to a first embodiment of the invention.
Figure 4:
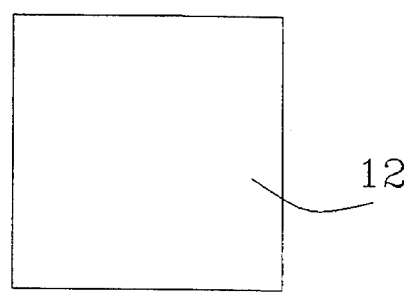
FIGS. 4 and 5 are cross-sections of light beams and beamlets, taken respectively in the planes 4—4 and 5—5 in FIG. 1.
Figure 5:
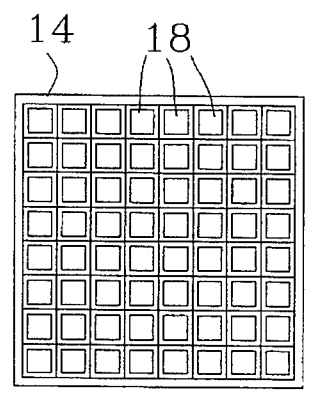

FIG. 1 shows a light source 10, e.g. a Nd YAG laser, for generating a collimated primary light beam 12 which is here assumed to be of square section, although other cross-sectional shapes can be used. The beam 12 is uninterrupted in its transverse dimensions, as seen in FIG. 4, and will preferably have a substantially uniform intensity throughout its width and height. If necessary, and when the light source 10 is a pulsed laser, a beam homogeniser (not shown) can be employed to achieve an acceptable approximation to such uniformity.

Figure 2:
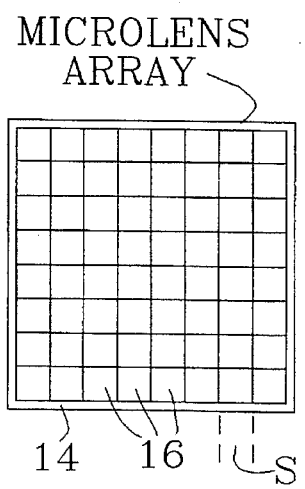
FIG. 2 is a front view of a typical microlens array used in such system.

The beam 12 is directed onto an array 14 of microlenses 16 that are closely packed together on a single substrate, as shown in FIG. 2. Monolithic lenslet modules of this type are commercially available with up to 70 thousand lenslets, and the size of each lenslet can typically range from 80 µm to 1 mm. For ease of illustration it has been assumed that the array 14 contains 64 lenslets 16 arranged in eight columns and eight rows, although in carrying out this embodiment of the invention in practice a larger number of lenslets will normally be used, for example at least 225 lenslets arranged in a square of 15×15. The light that passes through each lenslet 16 constitutes a beamlet 18 that is focused to a focal plane FP. In the example shown in FIG. 1 all the beamlets 18 are shown focused to a common focal plane FP, which, in this example coincides with the surface of a workpiece 20. However, lenslet modules are available in which the focal lengths of the respective lenslets are different from each other. Hence, if the surface of the workpiece is curved, for example, the focal lengths of the lenslets can be so selected that their respective beamlets define a focal surface coincident with such curved surface.

Diffractive optics are also available that use diffractive means to split a laser beam into a number of smaller beamlets that can be focused at different distances from the optic and may be parallel to each other or divergent from each other. Such a diffractive optic can be used instead of the microlens array 14. See, for example, "Synthetic digital-phase gratings—Designs, features applications" by H. Dammann published in Proceedings of SPIE (International Society of Optical Engineering (US)), vol. 437, pp. 72–78, (1983).

However, not all the beamlets 18 reach the workpiece 20, because interposed between the microlens array 14 (or equivalent light converting means) and the workpiece 20 there is a stencil mask 22 having holes 24 (FIG. 3) that only allow those beamlets 18 to pass through that trace out the selected pattern to be marked on the workpiece. In the example shown, this pattern is a stylized capital letter A. All the other beamlets are occluded, with their energy being absorbed by the mask material.

As explained in more detail below, perfect focusing to a point is not achieved in practice, the spots formed on the workpiece 20 having finite transverse dimensions as shown in FIG. 6. If the location of the surface of the workpiece 20 at the focal plane FP, as shown in FIG. 1, causes these spots to be smaller than desired, the workpiece can be moved in either direction away from or towards the mask 22 by adjustment means 20A. For example, if the workpiece surface were to be made coincident with the plane 6A—6A on which FIG. 6A is taken, the spots will be seen to be larger. Note, however, that the overall size of the pattern is substantially unchanged.

The cross-sectional shape of the beamlets need not necessarily be square as shown in FIGS. 6 and 6A, but may have any convenient cross-sections that can most readily be generated by the microlens array 14 or its equivalent. This may include square, hexagonal, round, or rectangular, and the focal property of each lens need not be spherical, but could also be aspherical, cylindrical or any other appropriate shape. Although the shape of each focused beamlet has been referred to herein as a spot or pixel, the actual cross-sectional shape and energy distribution at or near the focal point will be affected by the shape and focal property of the lenslet. It is also possible to choose a linear array of, for example, cylindrical lenslets 16A of rectangular cross-section as shown in FIG. 18. In this case, the shape of each focused beamlet will be rectangular, and the pattern formed by focused light at the workpiece after passing through the mask will be an array in the form of the pattern passed by the mask. FIG. 19 shows a stylized letter B formed in this way.

As a practical example, an array of spherical microlenses with square cross-section as in FIG. 2, will now be considered in more detail.

Expressing the focusing considerations in mathematical terms and assuming the use of a laser, such as a Nd YAG laser, as the light source, the width D of each spot at the workpiece as shown in FIG. 6 can be calculated using the formula $$D = F \times d$$

where d is the divergence of the beamlet that passes through each microlens 16, and F is the focal length of such microlens. The divergence is the greater of the divergence of the laser beam and the diffraction-limited divergence of an aperture of width S (FIG. 2), which is given by the formula $$d = 1.2 w/S$$

where w is the wavelength of the light. Thus, for example, for a microlens width S of 0.4 mm, a microlens focal length F of 4.3 cm, and a diffraction-limited Nd YAG laser beam of initial diameter 6 mm and a wavelength of 1 micron, the diffraction-limited divergence of each beamlet is $$d = 1.2 \times (0.001/0.4) = 3 \text{ milliradians}$$

and the size of the focal spot for each microlens is $$D = 43 \times 0.003 = 0.13 \text{ mm}.$$

These formulae give an approximate description of spot diameter or width, which can vary somewhat depending on the uniformity of energy distribution within each beamlet and the threshold characteristics of the material to be marked.

In this example, the mark at a focal plane that is spaced approximately 4.3 cm from a 15×15 microlens array will thus consist of an array of 15×15 spots each of width D equal to 0.13 mm, spaced apart by a pitch P (FIG. 6) of approximately 0.4 mm, i.e. for a value of N, the ratio P/D, of approximately 3. The energy density of the mark made by each dot will be increased by the square of this value, i.e. 9. This means that a laser with a pulse energy nine times less than that required to mark a solid character will provide a dot matrix character of the same overall size at the image plane with the same energy density in the spots. By moving the workpiece surface away from the image plane or changing the focal length of the microlenses the value of N can be reduced to improve legibility, but at the expense of some of the advantage in the reduction in the energy requirement.

The feature that each beamlet is focused independently of the other beamlets thus provides ready control over the ratio N. As already indicated, the smaller each spot is, i.e. the smaller the value of D, the higher will be the energy concentration of each beamlet 18 impacting on the workpiece. While the spots can thus be formed from a primary beam 12 of lower power, this advantage has been achieved without reducing the overall dimension A of the marked pattern.

The practical requirement for reasonable legibility of the pattern marked on the workpiece prevents the ratio N being made too large. Depending on circumstances, including the number of lenslets in the array 14, a value of about 3 for N will in many cases provide a satisfactory compromise between the need for legibility and the need to require only a relatively low energy output from the laser or other light source.

This ability to adjust the ratio N by simply varying the location of the workpiece is absent from the prior art. Taking as an example the proposal illustrated in FIG. 2 of the Kuwabara et al. patent referred to above, if the focal length of the focusing lens 16 is varied, or the location of the workpiece 17 relative to the focal plane is varied, there will be simultaneous variation at the workpiece surface of both the overall pattern size and the size of each individual beamlet that passes through those portions of the liquid crystal device 13, e.g. portion 13S, that are energized to transmit. In other words, unlike the present invention, the ratio N is fixed in the prior art.

Figure 7:
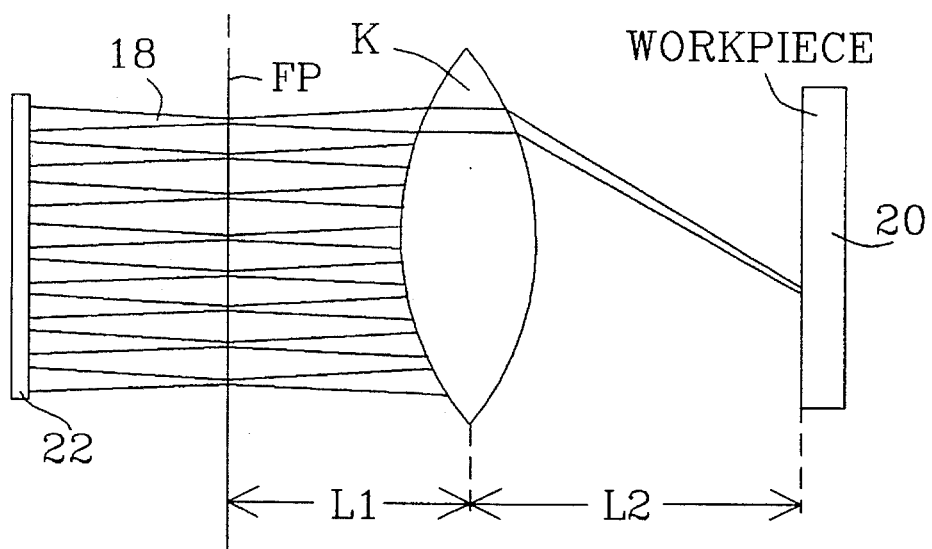
FIG. 7 is a view of an addition to the embodiment of FIG. 1.

In some cases, the energy density of the spots and/or the overall size of the pattern may not be optimal for a particular workpiece or situation, in which case an additional optical system can be used to change the size. As shown in FIG. 7, the image formed in space at the focal plane FP of the beamlets 18 can be further imaged using a lens system K with a demagnification equal to L1/L2 to make an inverted pattern of reduced size on a workpiece 20 that is located at the second image plane of the lens system K.

Figure 8:
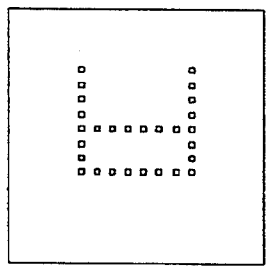
FIG. 8 is a front view of a typical pattern marked by the arrangement of FIG. 7.
Figure 10:
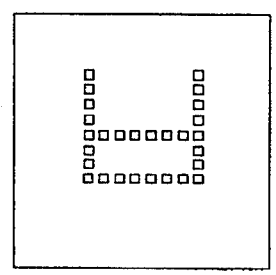
FIG. 10 is a front view of a typical pattern marked by the arrangement of FIG. 9.
Figure 9:
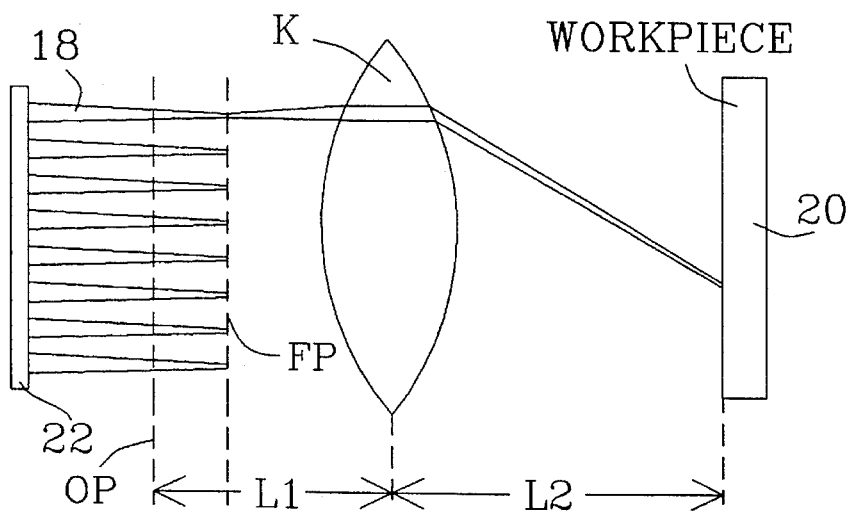
FIG. 9 is a view of an alternative addition to the embodiment of FIG. 1.

A still further alternative shown in FIG. 9 enables reduction of the pitch to dot ratio N by placing the object plane OP of the lens system K at a position other than the focal plane FP of the microlens array. FIGS. 8 and 10 provide a comparison between the patterns produced on the workpiece by the arrangements of FIGS. 7 and 9 respectively. The mask will normally be inverted to provide the desired upright image at the workpiece. Also, neither of FIGS. 7 and 9 is to scale, since L1 will be greater than L2 when demagnification is required. While the additional optical systems shown in FIG. 7 and 9 have been illustrated in conjunction with the embodiment of FIG. 1, they can also be employed with any alternative embodiment including those described below.

The sequence of elements shown in FIG. 1 can be reversed, as shown in FIG. 11, the primary beam 12 first encountering a mask 22A and subsequently the microlens array 14. FIGS. 11 and 12 show the subbeams 24 that will pass between the mask 22A and the microlens array 14, the interruptions 25 in these subbeams being necessary to maintain the mechanical integrity of the mask 22A. The beamlets 18 that are subsequently generated and focused by the array 14 travel to the workpiece 20 in a manner similar to those in FIG. 1, and will achieve essentially the same pattern of marking on the workpiece as in FIG. 6.

The physical type of stencil masks 22 and 22A shown in FIGS. 1 and 11, which need to be moved or replaced by another mask in order to change the pattern to be marked, can be replaced by a different type of light modifying device, e.g. one in the form of an "electronic mask" that does not require physical displacement. For example, devices are known, usually called light valves, that can be switched to transmit all or none of a light beam. Other devices, usually called spatial light modulators, can be controlled to transmit a variable percentage of light over a range extending from none to all. Some such devices employ mechanical means, such as shutters that move into or out of the beam. Others employ electro-optical means, such as liquid crystal light valves, or magneto-optical means. See, for example, (a) "Optically-addressed spatial light modulators" by T. D. Hudson et al., published in Optics and Laser Technology, Vol. 23, No. 5, 1991, pp 297–302;

(b) "Diffractive ferroelectric liquid-crysteal shutters for unpolarized light" by M. J. O'Callaghan et al., published in Optics Letters, Vol. 16, No. 10, May 1991, pp 770–772;

(c) "Optical characteristics of a deformable-mirror spatial light modulator" by D. A. Gregory et al., published in Optics Letters, Vol. 13, No. 1, January 1988, pp 10–12;

(d) "Spatial light modulators with super twisted nematic liquid crystals" by K. Hirabayashi et al., published in Optics Letters, Vol. 16, No. 10, May 1991, pp 764–766;

(e) "Generation of programmable coherent source arrays using spatial light modulators" by A. Marrakchi et al., published in Optics Letters, Vol 16, No. 12, June 1991, pp 931–933;

(f) "A 128×128 frame-addressed deformable mirror spatial light modulator" by R. M. Boysel, published in Optical Engineering, Vol. 30, No. 9, September 1991, pp 1422–1427;

(g) "Development of a spatial light modulator: a randomly addressed liquid-crystal-over-nMOS array" by D. J. McKnight et al., published in Applied Optics, November 1989, Vol. 28, No. 22, pp 4757–4781;

(h) "Evolutionary development of advanced liquid crystal spatial light modulators" by N. Collings et al., published in Applied Optics, November 1989, Vol. 28, No. 22, pp 4740–4746;

(i) U.S. Pat. No. 4,383,255 issued May 10, 1983 to P. A. Grandjean et al.;

(j) U.S. Pat. No. 4,563,059 issued Jan. 7, 1986 to N. A. Clark et al.; and (k) U.S. Pat. No. 4,584,056 issued Apr. 22, 1986 to A. Perret et al.

Figure 3:
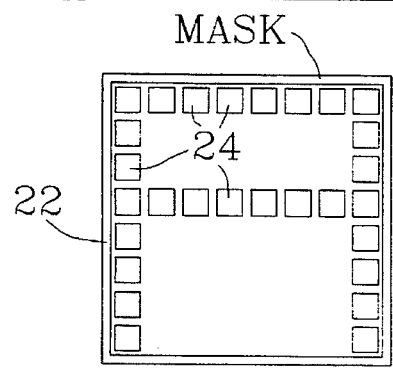
FIG. 3 is a front view of a stencil mask used in such system.

As shown in FIG. 13, such a light modifying device 26 can form an array controlled by a computer 27, to achieve the same effect as the stencil mask of FIGS. 1 and 3, with the advantage that the pattern can be changed substantially instantaneously by the computer.

Figure 14:
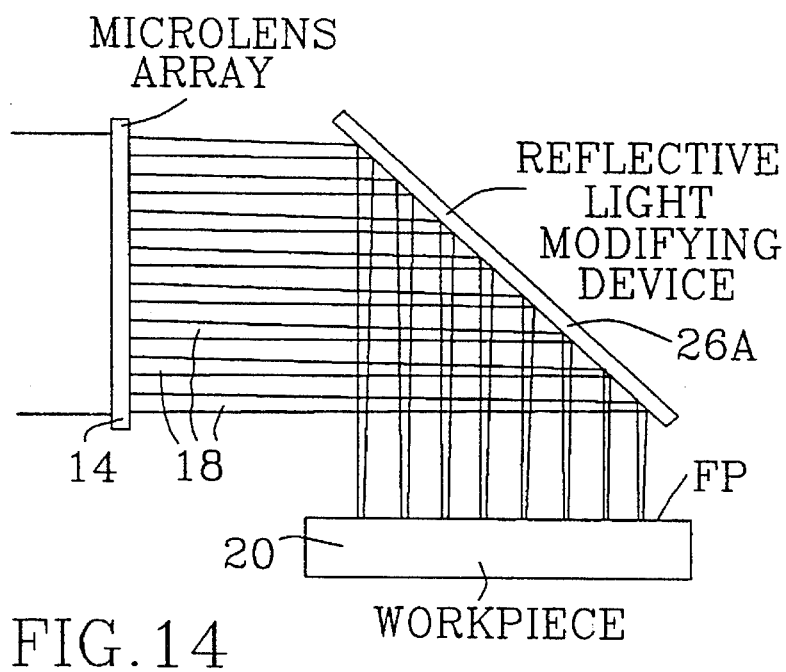
FIG. 14 shows yet another modification.

Some of these light modifying devices can function by reflection, and, as such, may be adapted to the present invention as shown diagrammatically at 26A in FIG. 14.

Since some of these light modifying devices have the feature, in addition to their on-off function of passing or not passing light, of a continuously variable transmission capability, they can be used to achieve a gray scale in the marked pattern, e.g. by partial absorption, partial reflection or partial transmission.

In each of the embodiments of this invention described above, any of the beamlets that are not chosen to mark the appropriate patterned array on the workpiece have been absorbed or deflected away, so that the energy is wasted. A further aspect of the present invention addresses this disadvantage by not only controlling the transmission (or reflection) of selected beamlets, but by also providing for the redirection of one or more of the beamlets not used to form the patterned array into a direction in which its energy can be used to contribute to a mark. Arrays of electro-optical elements are available that can change the direction of transmitted, diffracted, or reflected light rays, such direction being controlled in either a stepwise or a continuously variable manner. See particularly the O'Callaghan et al. paper, item (b), referred to above. Arrays of variable gratings based on this technique are yet another example of electro-optical elements that can be used to control the direction of diffracted beamlets. By varying the periodicity of gratings formed by liquid crystal pixels, the beamlets can be diffracted into various angles. Controlled diffraction in two dimensions can be achieved by using a pair of such arrays in series. Arrays of electromechanical elements are also available that can change the direction of reflected light beams over a large range of angles. See particularly the Boysel paper, item (f), referred to above. Other techniques are known for changing the angle of light beams, include arrays of small reflectors held on torsional mounts, or arrays of acousto-optical crystals, electro-optical crystals or other nonlinear optical devices. Further examples of acousto-optic deflection devices are given by (l) "Acousto-Optic Devices: Diverse Applications" by M. Noble, published in Lasers and Optronics March 1992, pp 27–29; and (m) "Multichannel Bragg cells: design, performance, and applications" by D. R. Pape, published in Optical Engineering, October 1992, Vol. 31, No. 10, pp. 2148–2158.

There are a number of other formats available to perform this function, which has become designated as the area of "smart pixels", because it utilizes a digital or pixelated format with electronic control of each pixel by a computerized device. Liquid crystal television screens are a widely known part of this field of smart pixels.

Figure 15:
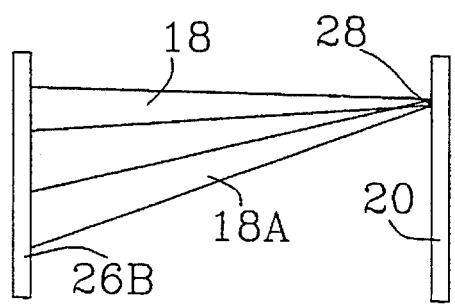
FIG. 15 shows a still further modification.
Figure 16:
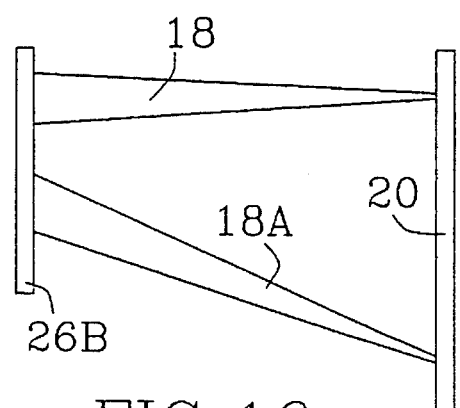
FIG. 16 shows a plan view of an alternative to the FIG. 15 construction.
Figure 17:
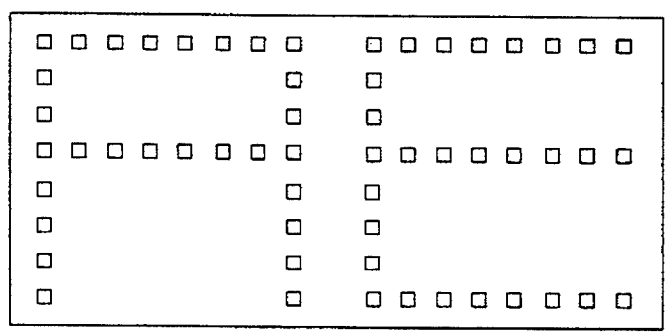
FIG. 17 shows a typical pattern produced by FIG. 16.

A preferred embodiment of this further aspect of the invention that utilizes one of these techniques is shown diagrammatically in FIG. 15. After separation of a primary beam by a stencil mask or other light modifying device 26B into an array of beamlets 18 for forming the patterned array, at least one other beamlet 18A that would be within a blank space of the pattern can be so redirected as to be superimposed on an undeflected beamlets 18 at 28 on the workpiece 20 to enhance the marking effect. Alternatively, as shown in FIG. 16, the deflected beamlet 18A can be used to form part of a second and separate pattern. As shown in FIG. 17, a number of such deflected beamlets 18A can be used, for example to form a stylized E beside the primary pattern A. In either case, i.e. FIG. 15 or FIGS. 16 and 17, the result is a more efficient use of the available light energy.

Although in FIGS. 15 and 16 the beams 18 and 18A are shown as focused beamlets, which will normally be the preferred arrangement, such focusing of the beamlets in this aspect of the invention is not essential, since the objective of achieving a more efficient use of the light energy is now achieved by the utilization of the energy that would normally be wasted.

We claim:

1. A method of marking a workpiece in a selected pattern with light energy from a primary light beam, comprising the steps of:

(a) transmitting to the workpiece portions of the light of the primary beam required to produce marks on the workpiece, while at least partially attenuating or redirecting the remainder of the light of the primary beam, and (b) converting at least such mark-producing portions of the primary beam into a plurality of individual beamlets, said converting step including focusing each beamlet independently of the other beamlets;

said transmitting and converting steps being performed separately and sequentially with either said transmitting step preceding said converting step or said converting step preceding said transmitting step, the beamlets corresponding to said mark-producing light portions forming respective marks on the workpiece that are disposed in an array corresponding to the selected pattern;

including adjusting the location of the workpiece along the beamlets in order to vary the size and energy density of each beamlet at the workpiece substantially without changing the overall size of said selected pattern.

2. A method according to claim 1, wherein the beamlets together define a focal plane.

3. A method of marking a workpiece in a selected pattern with light energy from a primary light beam, comprising the steps of:

(a) transmitting to the workpiece portions of the light of the primary beam required to produce marks on the workpiece, while at least partially attenuating or redirecting the remainder of the light of the primary beam, and (b) converting at least such mark-producing portions of the primary beam into a plurality of individual beamlets, said converting step including focusing each beamlet independently of the other beamlets;

said transmitting and converting steps being performed separately and sequentially with either said transmitting step preceding said converting step or said converting step preceding said transmitting step, the beamlets corresponding to said mark-producing light portions forming respective marks on the workpiece that are disposed in an array corresponding to the selected pattern, including converting at least some of said remainder of the light of the primary beam into at least one further individual beamlet, and directing said further beamlet to strike the workpiece at a location substantially coincident with a beamlet converted from a said mark-producing portion of the primary beam whereby to reinforce the marking effect of the latter beamlet.

4. A method of marking a workpiece in a selected pattern with light energy from a primary light beam, comprising the steps of:

(a) transmitting to the workpiece portions of the light of the primary beam required to produce marks on the workpiece, while at least partially attenuating or redirecting the remainder of the light of the primary beam, and (b) converting at least such mark-producing portions of the primary beam into a plurality of individual beamlets, said converting step including focusing each beamlet independently of the other beamlets;

said transmitting and converting steps being performed separately and sequentially with either said transmitting step preceding said converting step or said converting step preceding said transmitting step, the beamlets corresponding to said mark-producing light portions forming respective marks on the workpiece that are disposed in an array corresponding to the selected pattern, including converting at least some of said remainder of the light of the primary beam into at least one further individual beamlet, and directing said further beamlet to strike the workpiece at a location to form a mark of a second selected pattern on the workpiece.

5. A method of marking a workpiece in a selected pattern with light energy from a primary light beam, comprising the steps of:

(a) transmitting to the workpiece portions of the light of the primary beam required to produce marks on the workpiece, while at least partially redirecting the remainder of the light of the primary beam, and (b) converting at least such mark-producing portions of the primary beam into a plurality of individual beamlets, whereby the beamlets corresponding to said mark-producing light portions form respective marks on the workpiece that are disposed in an array corresponding to the selected pattern; and (c) converting at least some of said redirected remainder of the light of the primary beam into at least one further beamlet and directing said further beamlet to strike the workpiece at another selected location,.

6. A method according to claim 5, wherein said another selected location is substantially coincident with a location at which a beamlet producing a mark of said array strikes the workpiece in order to reinforce the marking effect of the latter beamlet.

7. A method according to claim 5, wherein said another selected location is such as to form a mark of a second selected pattern on the workpiece.

8. Apparatus for marking a workpiece in a selected pattern with light energy from a primary light beam, comprising:

(a) light modifying means for transmitting to the workpiece portions of the light of the primary beam required to produce marks on the workpiece, while at least partially attenuating or redirecting the remainder of the light of the primary beam, and (b) means separate from said light modifying means for converting at least such mark-producing portions of the primary beam into a plurality of individual beamlets and for focusing each said beamlet independently of the other beamlets;

(c) said light modifying means and said converting means being spaced apart between the primary light beam and the workpiece, with either said light modifying means preceding said converting means or said converting means preceding said light modifying means, whereby the beamlets corresponding to said mark-producing light portions form respective marks on the workpiece disposed in an array corresponding to the selected pattern, (d) including means for converting at least some of said remainder of the light of the primary beam into at least one further individual beamlet.

9. Apparatus according to claim 8, including means for directing said further beamlet to strike the workpiece at a location substantially coincident with a beamlet forming a mark of said array in order to reinforce the marking effect of the latter beamlet.

10. Apparatus according to claim 8, including means for directing said further beamlet to strike the workpiece at a location to form a mark of a second selected pattern on the workpiece.

11. Apparatus according to claim 8, wherein said converting means includes a microlens array for forming and focusing each said beamlet.

12. Apparatus according to claim 8, wherein said converting means is disposed to receive the primary light beam and convert it into said individual beamlets, and said light modifying means is disposed to receive said beamlets from the converting means.

13. Apparatus according to claim 8, wherein said light modifying means is disposed to receive the primary light beam and transmit a plurality of subbeams arrayed in the selected pattern, and said converting means is disposed to convert said subbeams into a plurality of beamlets that together form the selected pattern.

14. Apparatus for marking a workpiece in a selected pattern with light energy from a primary light beam, comprising:

(a) light modifying means for transmitting to the workpiece portions of the light of the primary beam required to produce marks on the workpiece, while at least partially attenuating or redirecting the remainder of the light of the primary beam, and (b) means separate from said light modifying means for converting at least such mark-producing portions of the primary beam into a plurality of individual beamlets and for focusing each said beamlet independently of the other beamlets;

(c) said light modifying means and said converting means being spaced apart in either sequence between the primary light beam and the workpiece, whereby the beamlets corresponding to said mark-producing light portions form respective marks on the workpiece disposed in an array corresponding to the selected pattern, wherein said light modifying means comprises a stencil mask, a light valve, a spatial light modulator, or an electro-optical or magneto-optical device.

15. Apparatus for marking a workpiece in a selected pattern with light energy, comprising (a) means for converting a primary light beam into a plurality of individual beamlets and transmitting to the workpiece only those beamlets required to form an array of individual marks on the workpiece that together form the selected pattern; and (b) means for directing at least one further beamlet not forming part of said array to strike the workpiece at a location that is substantially coincident with a beamlet that forms a mark of said array whereby to reinforce the marking effect of the latter beamlet.

16. Apparatus for marking a workpiece in a selected pattern with light energy, comprising (a) means for converting a primary light beam into a plurality of individual beamlets and transmitting to the workpiece only those beamlets required to form an array of individual marks on the workpiece that together form the selected pattern; and (b) means for directing at least one further beamlet not forming part of said array to strike the workpiece at a location on the workpiece to form a mark of a second selected pattern on the workpiece.

* * * * *